United States Patent
Gabor

[11] 3,764,979
[45] Oct. 9, 1973

[54] HOLOGRAPHIC SYSTEM FOR SUBJECT RECOGNITION PERMITTING CONVERSION OF A PATTERN INTO A MACHINE-READABLE FORM

[75] Inventor: Dennis Gabor, London, England

[73] Assignee: International Business Machines Corporation, Armonk, N.Y.

[22] Filed: Aug. 3, 1971

[21] Appl. No.: 168,712

Related U.S. Application Data

[60] Division of Ser. No. 48,842, June 11, 1970, Pat. No. 3,600,054, which is a continuation of Ser. No. 565,519, July 15, 1966, abandoned.

[30] Foreign Application Priority Data
Aug. 13, 1965   Great Britain.................... 34,703/65
Mar. 1, 1966   Great Britain...................... 8,945/66

[52] U.S. Cl............................. 340/146.3 P, 350/3.5
[51] Int. Cl............................................. G06g 9/00
[58] Field of Search.............................. 340/146.3 P; 250/219 D; 350/3.5

[56] References Cited
UNITED STATES PATENTS
3,296,594   1/1967   Van Heerden....................... 350/3.5

*Primary Examiner*—David Schonberg
*Assistant Examiner*—Ronald J. Stern
*Attorney*—John J. Goodwin

[57] ABSTRACT

A holographic device for producing output image patterns in response to different input pattern wavefronts is described. A novel hologram is formed by the interference of a first pattern of electromagnetic waves and a second pattern of electromagnetic waves. The resultant hologram may be irradiated with a pattern of electromagnetic waves corresponding to the first pattern to reconstruct the second pattern of electromagnetic waves, and vice versa. To form the hologram a coherent light beam, such as from a laser, is directed on an object such as a transparency having a pattern thereon. The light from the object is directed onto a photographic emulsion. A coherent light beam also illuminates a second pattern, such as a coded apertured plate, and the light passing through the apertures is directed onto the photographic emulsion where it forms an interference pattern with the light from the first pattern. A hologram is thereby formed which, when illuminated by a pattern similar to one of the original patterns will reconstruct an image of the other original pattern.

13 Claims, 42 Drawing Figures

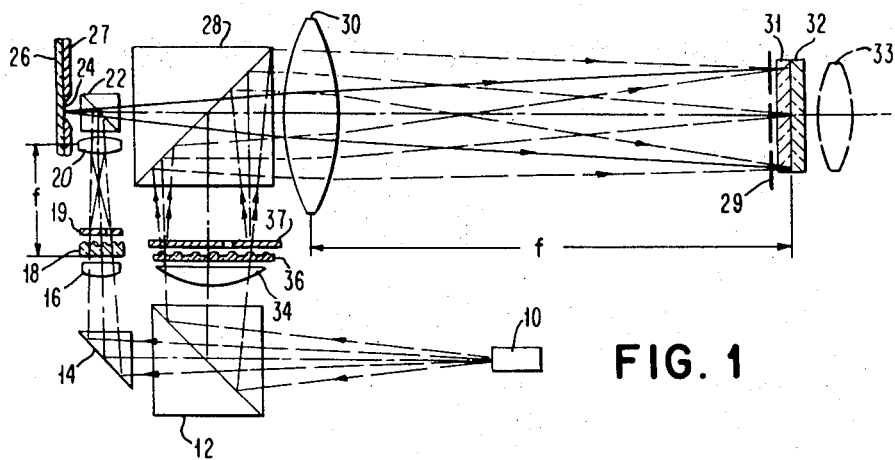
FIG. 1
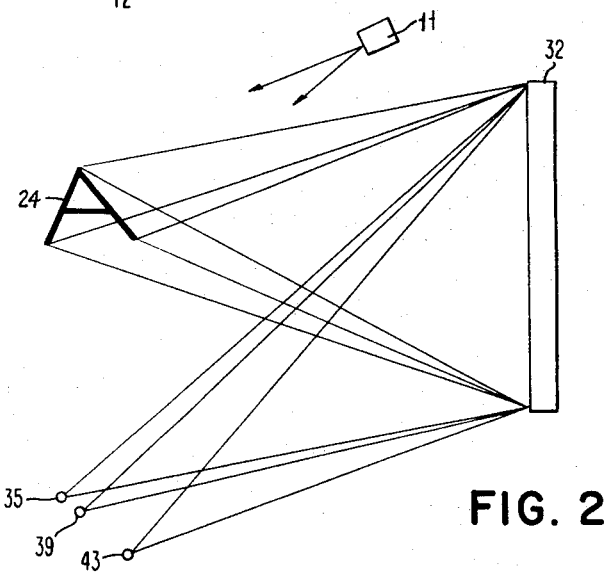
FIG. 2
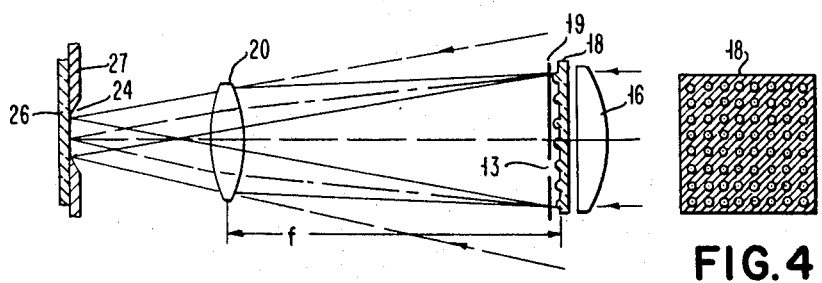
FIG. 3
FIG. 4
INVENTOR
DENNIS GABOR

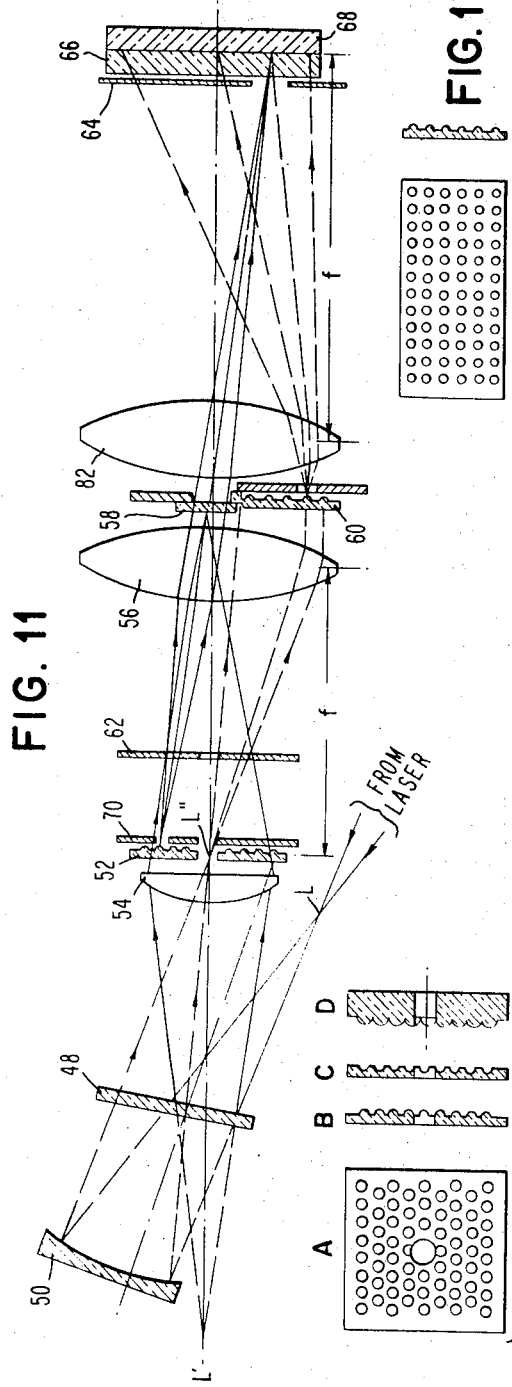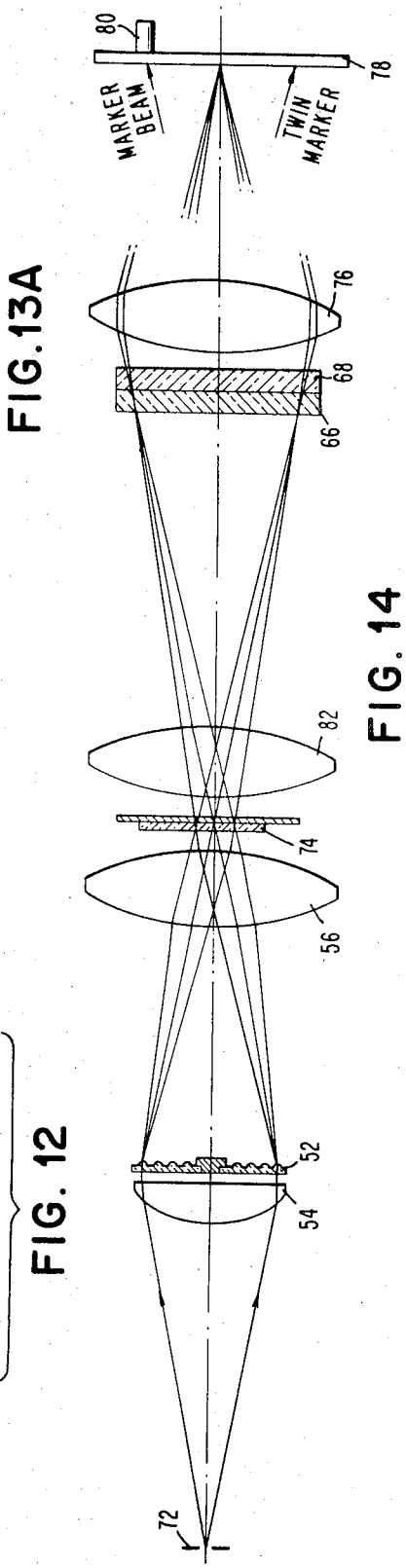

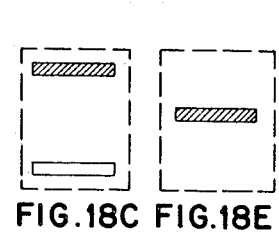
FIG. 15A    FIG. 15B
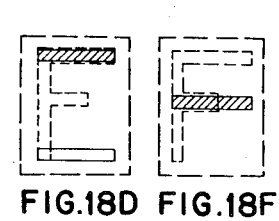
FIG. 16A    FIG. 16B
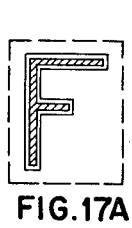 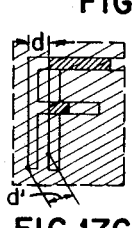 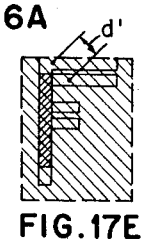 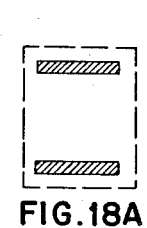
FIG. 17A   FIG. 17C   FIG. 17E   FIG. 18A   FIG. 18C   FIG. 18E
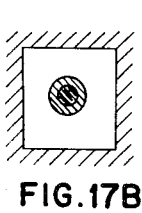 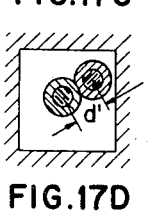 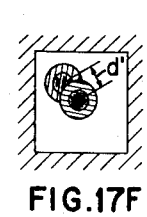 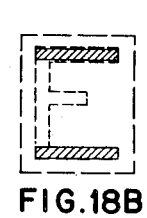
FIG. 17B   FIG. 17D   FIG. 17F   FIG. 18B   FIG. 18D   FIG. 18F
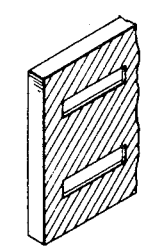 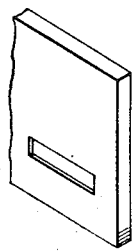 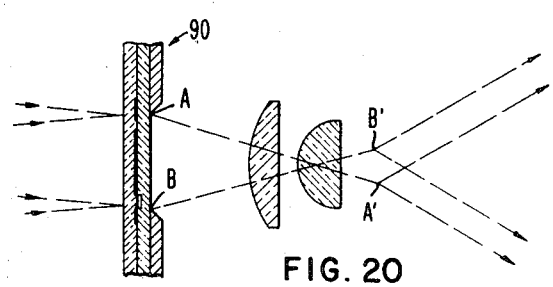
FIG. 19A    FIG. 19B    FIG. 20
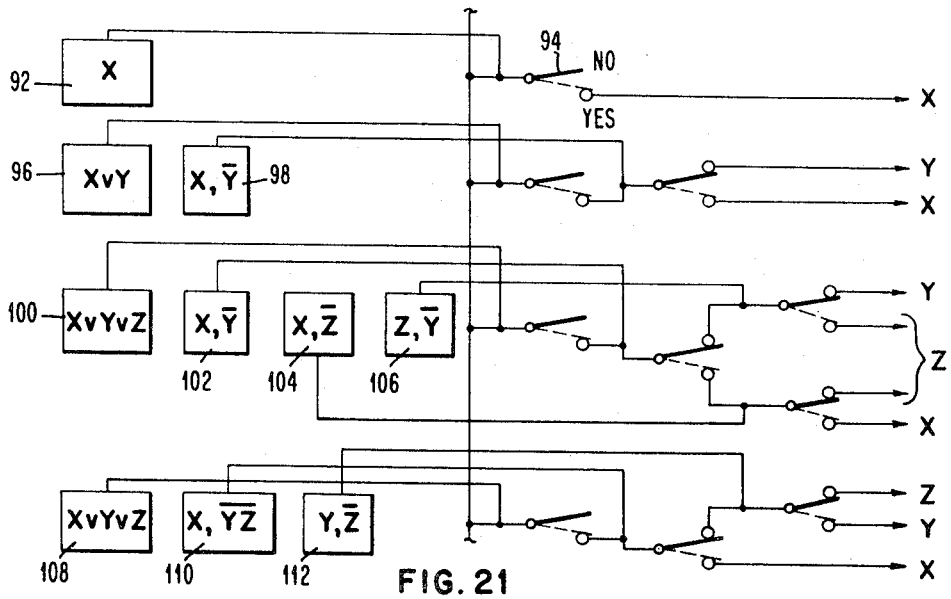
FIG. 21

FIG. 22  FIG. 23  FIG. 24
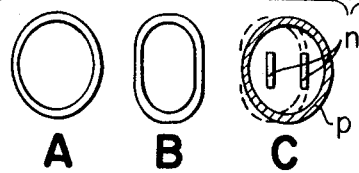
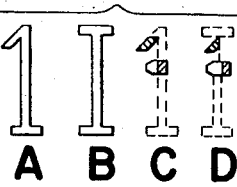
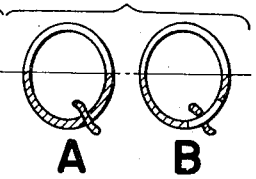
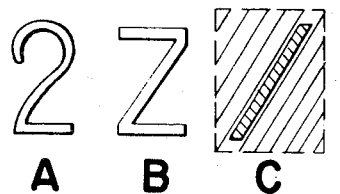
FIG. 25
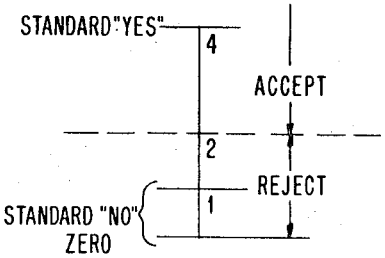
FIG. 26
FIG. 27

HOLOGRAPHIC SYSTEM FOR SUBJECT RECOGNITION PERMITTING CONVERSION OF A PATTERN INTO A MACHINE-READABLE FORM

CROSS-REFERENCE TO RELATED APPLICATIONS

This application is a divisional application of copending application Ser. No. 48,842, filed June 11, 1970, now U.S. Pat. No. 3,600,054, which is in turn a continuation of Ser. No. 565,519, filed July 15, 1966, and now abandoned.

A hologram is the name given to a photographic film having an interference pattern recorded thereon. The interference pattern is usually produced by a source of coherent light which is normally split into two beams, one of which is directed onto the sheet of photographic film, and the other of which is directed onto a subject. The beam directed onto the subject is scattered onto the sheet of film with waves of varied orientation and wavefront curvature. The scattered light waves and the undisturbed beam are reunited at the film where they interfere as patterns of light and dark areas which are photographically recorded.

When a source of coherent light is directed through the patterned film sheet, it is diffracted into a number of diffraction orders. At least one of these orders duplicates the waves that were originally reflected from the subject, and a person viewing the film sees the subject of the hologram in three dimensions, with the subject appearing behind the hologram at a distance equal to the original subject to film distance. If the viewer changes his position and views the hologram from a different angle, the three dimensional perspective changes and the viewer may thus look around an object in the foreground to see an object behind it.

The theory of holograms and experimental data in regard to their formation and reconstruction has been reported in the literature and detailed information thereof can be found in:

1. The Proceedings of the Royal Society, Section A, Volume 197, 1949, at pages 454–487;
2. Proceedings of the Physical Society, Section B, Volume 64, 1951, at pages 449–469;
3. "The Formation of the Diffraction Image With Electrons in the Gabor Diffraction Microscope," M. E. Haine and T. Mulvey, Journal of the Optical Society of America, Volume 42, Number 10, October 1952, at pages 763–773;
April
4. "Image Formation By Reconstructed Wave Fronts. I. Physical Principles and Methods of Refinement," Paul Kirkpatric and Hussen M. A. El-Sum, Journal of the Optical Society of America, Volume 46, Number 10, October 1956, at pages 825–831. Also, further information can be found in U.S. Pat. No. 2,770,166 issued Nov. 13, 1956 to D. Gabor, entitled "Improvements in and Relating to Optical Apparatus for Producing Multiple Interference Patterns" and U.S. Pat. No. 3,083,615 issued Apr. 2, 1963 to H. M. El-Sum entitled "Optical Apparatus for Making and Reconstructing Holograms."

In the present invention a novel hologram is provided which is formed by the interference of a first pattern of electromagnetic waves and a second pattern of electromagnetic waves and means are provided such that the hologram may be irradiated with a pattern of electromagnetic waves corresponding to the first pattern to reconstruct the second pattern of electromagnetic waves, and vice versa, A first plurality of separate patterns may be applied to separate portions of the holographic plate each one of which forms a separate hologram with separate ones of a second plurality of patterns such that when the resultant holographic plate is irradiated with a pattern corresponding to one of the first plurality of patterns, the associated one of the second plurality is reconstructed, and vice versa.

It is an object of the present invention to provide an improved optical device for producing and reconstructing holograms.

Another object of the present invention is to provide an optical system including a hologram for reconstructing a first wavefront pattern by irradiating the hologram with a second wavefront pattern.

Still another object of the present invention is to provide an improved optical system for translating first patterns into second patterns employing a hologram having a stored interference pattern produced by the first and second patterns.

A further object of the present invention is to provide an optical system for translating patterns and symbols into associated codes.

Another object of the present invention is to provide a holographic system for character recognition of letters and symbols and generating a unique code word in response to each letter and symbol specimen.

Still another object of the present invention is to provide a holographic system for character recognition wherein light subtraction techniques are employed to enhance distinctions between different characters.

A still further object of the present invention is to provide a holographic system including a code device for irradiating a holographic plate with coded wavefront patterns.

And another object of the present invention is to provide a relatively registration invariant character reading device.

The foregoing and other objects, features and advantages of the invention will be apparent from the following more particular description of preferred embodiments of the invention, as illustrated in the accompanying drawings.

In the drawings:

FIG. 1 is a schematic drawing of an optical system for producing holograms according to the principles of the present invention.

FIG. 2 is a simplified schematic drawing derived from FIG. 1.

FIG. 3 is a schematic of a detail of FIG. 1 having rearranged optics for the purposes of explanation.

FIG. 4 is a front view of an illuminator plate used in the system of FIG. 1.

Figure 8:
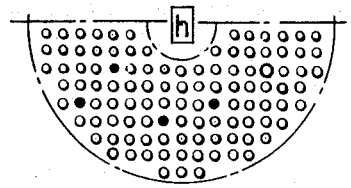
Figure 9:
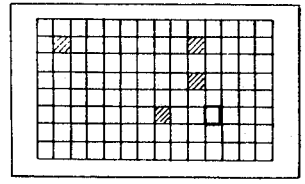
Figure 10:
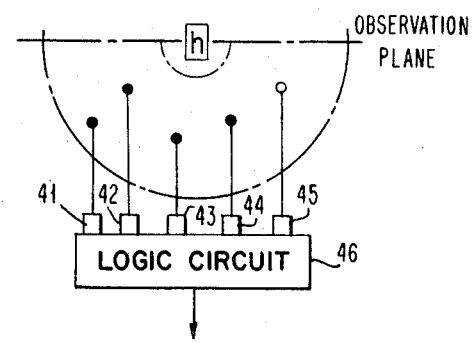

FIGS. 8, 9 and 10 schematically represent a code plate, a hologram plate and a read out logic circuit respectively of another embodiment of the present invention.

FIG. 11 is a schematic diagram of an alternate embodiment for forming holograms according to the principles of the present invention.

FIGS. 12A, 12B, 12C, 12D are details of illuminator plates and 13A, 13B are details of code plates employed in the system of FIG. 11.

FIG. 14 is a schematic diagram of an embodiment of a system for reading holograms produced by the system of FIG. 11.

FIGS. 15A, 15B, 16A, 16B, 17A through 17F, and 18A through 18F are provided as an aid in explaining phonomena which occur in the operation of the present invention.

FIGS. 19A and 19B are partial views of another form of discriminators employed in an embodiment of the present invention.

FIG. 20 illustrates a type of reducing optics for use in an embodiment of the present invention.

FIG. 21 is a schematic drawing of details of a logic circuit for use in a system shown in FIG. 10.

FIGS. 22A, 22B, 22C, 23A, 23B, 23C, 23D, 24A, 24B, and 25A, 25B, 25C illustrate four examples of discriminators between signs with only slight distinctive features.

FIG. 26 illustrates a preferred acceptor-reject scheme for properly designed discriminators.

FIG. 27 is a table of discriminators satisfying the criterion of FIG. 26 for the 10 numerals 0 through 9.

Figure 28:
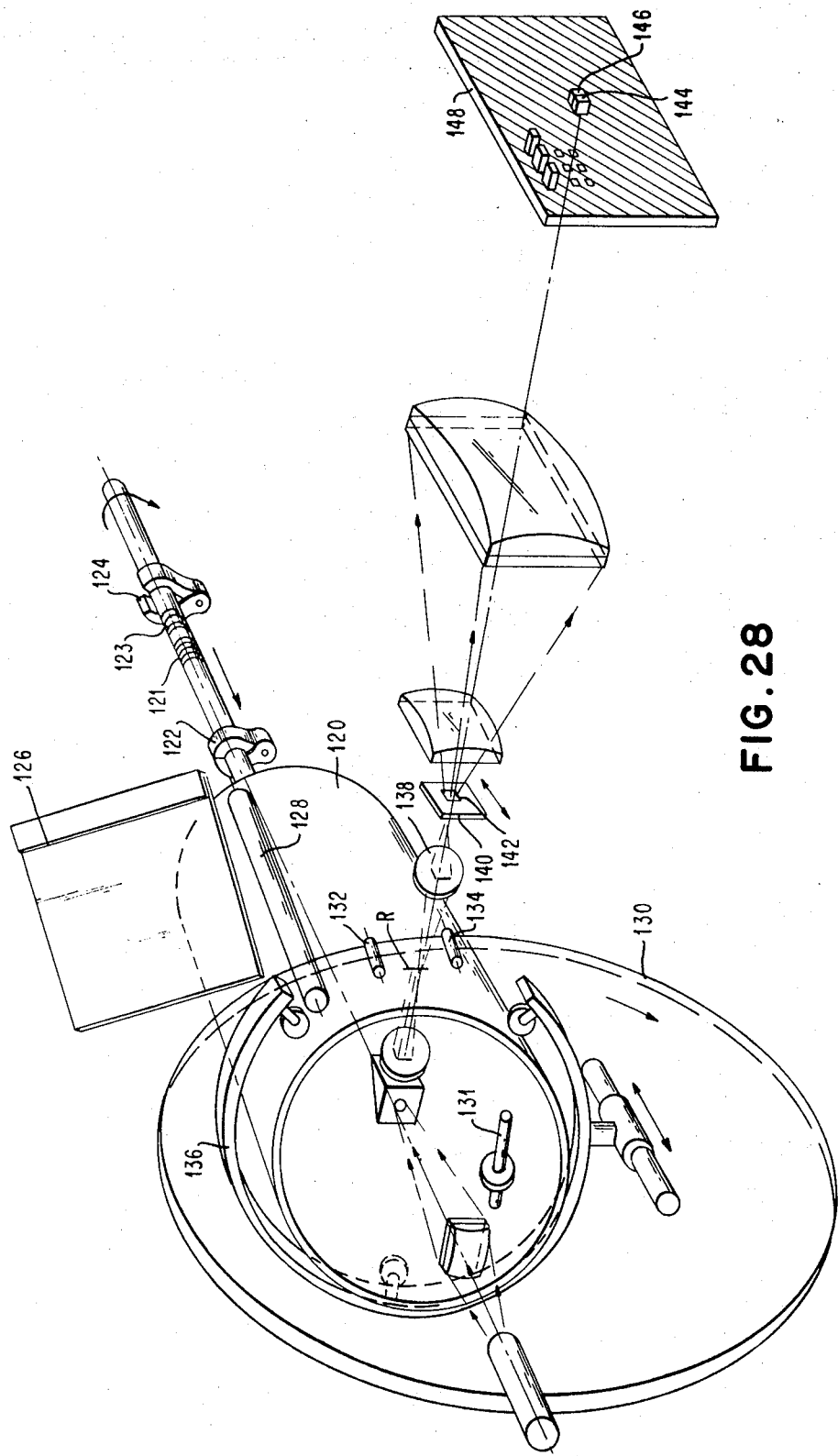

FIG. 28 is a schematic drawing of a high speed reading device for printed or typewritten sheets.

Referring to FIG. 1, a system for forming and reconstructing holograms according to the present invention is shown including, a source of coherent light 10, preferably a laser, which is directed through and divided by a beam splitting prism 12. The portion of the coherent beam transmitted through the prism 12 is reflected by a reflecting prism 14 through a field lens 16, an illuminator plate 18, a mask 19, a collimator lens 20, and another beam splitting prism 22 onto a subject 24, referred to as a sign or discriminator, carried by a support 26. A mask 27 having a window is placed between prism 22 and support 26 to provide a defined subject area. The beam portion is reflected by the subject sign or discriminator and is transmitted back through the beam splitting prism 22 through another beam splitting prism 28 and lens 30 which is positioned so that its rear focal plane (the Fraunhofer or Fourier-plane) coincides exactly or approximately with the emulsion of a photographic plate 32. The medium on which the subject sign or discriminator is located or printed is a suitable graphic medium which will be later described.

The other portion of the beam from source 10 which is reflected by the first beam splitting prism 12 continues through a field lens 34, through a code or marker plate 36, a code or marker plate 37, the beam splitting prism 28 and the lens 30 to also be directed onto the emulsion of photographic plate 32. Note that a mask 29, referred to as a "background reducer," and a mask 31, referred to as a "zero order mask," are located in front of photographic plate 32. These masks have specific functions and will be described more fully later in the discussion.

The function performed by the system of FIG. 1 can be better understood by referring to FIG. 2. In FIG. 2, a subject 24 is symbolically represented as a letter A which is presumed to be irradiated by coherent light from a source 11, the reflections of which fall onto photographic emulsion plate 32. At this point in the discussion, if plate 32 were also irradiated with a coherent reference beam, a convention hologram would be formed, and when the plate were developed and again irradiated with the coherent reference beam, a reconstructed image of the subject would be produced. In FIG. 2, however, a coherent reference beam is not employed, but instead a second pattern is used, for example, a plurality of discrete coherent point sources 35, 39, and 43, which, in the broad sense, represent beams produced by the code plate 36 of FIG. 1 as will be shown later. Now, when the photoplate is developed, and irradiated with a pattern corresponding to that of the subject "A," a reconstructed image of the pattern of discrete point sources 35, 39, and 41 is produced. It follows that if a number of separate and different subjects were sequentially irradiated onto separate portions of plate 32 simultaneously with separate and different combination arrangements of the discrete point sources (i.e., coded) then a resultant hologram is formed having separate interference patterns for each subject-point arrangement combination. Thus, when the plate is developed and irradiated with a pattern corresponding to one of the subject patterns, an image is produced of the associated one of the discrete point source combinations. The hologram can then be considered, in one aspect, to be a translator for converting one pattern to another pattern, for example, for converting numeral and letter characters into optically readable codes.

In the embodiments of the present invention to be described, one of the elements is a multiple hologram composed of a plurality of elementary holograms to be called "engrams." The engrams occupy small fractions of the total hologram, and are arranged side-by-side, but more than one of them may be photographed on top of one another. Each engram is the interference photograph of a subject pattern to be called a "sign" or "discriminator" with one or several reference beams to be called "marker beams." The marker beams are plane or spherical and issue from small sources, to be called "markers," which can be considered as point sources. In the embodiments, the marker beams and markers are provided by the operation of the code or marker plate 37 as shown in FIG. 1.

In the simplest case the discriminators may be the letters, numerals or other signs themselves which are to be identified. In this case the engram of a subject, for example, the sign "X" is formed by the interference of a wave issuing from the sign "X" with at least one marker beam. The wave which illuminates "X" in the taking of the hologram is at least approximately plane and issues in the first place from a point source, which is to be called the "illuminator" associated with "X." The illuminator point source is produced by illuminator plate 18 of FIG. 1 producing illuminator beams. The optics is so arranged that the whole diffraction figure of the sign "X" is confined within the area of its engram. After the hologram is formed or "taken," it is read with the same device for taking the hologram, or one which is its optical equivalent with the difference that there are no marker beams. In the reading mode the sign or discriminator which is to be identified (for example, "X") is illuminated simultaneously with all illuminator beams, so that all engrams are illuminated. By the principle of holography the diffraction pattern of a sign "X," falling on its engram will result in three emerging diffracted beams. One of these carries the image of "X," somewhat modified. A second beam is identical or almost identical with the marker beam, or group of marker beams with which the engram was produced, and carries the images of the marker or the group of markers. In the embodiments of the invention this image is focused in an observation plane, and is used to identify the sign. Thus, in FIG. 1, an observation lens 33 is positioned in the observation plane so that the marker images may be observed. A third beam or group of beams is similar to the second, but issues from the engram in directions symmetrical to the second with respect to the first beam. This is to be called the "twin beam," and is, in general, of a quality inferior to the second in respect of identification of signs.

The system as described, with engrams formed with the signs or discriminators themselves, operates satisfactorily but can be improved. It may occur that in some sets of signs the differences are not large enough to allow satisfactory discrimination. Other engrams than those of "X" will respond, though mostly with lower intensities, but it can happen, as for instance when an engram of "F" is presented with an "E," that the engram of the wrong sign will give a marker with the full intensity. In a preferred form of the invention to be described this difficulty is overcome by allotting, whenever necessary, several discriminators, each with its own engram to one sign, which, in combination, satisfactorily distinguish this sign from all others in the set. These discriminators are patterns, which are composed from the sign to be identified and those against which it is to be discriminated by two methods, singly or in combination. In the first method the discriminator contains only the distinctive parts of the trace which forms the letter or letters to be identified, the others are left out. For instance the letter "L" is distinguished from "I" by its lower trace _. In the second, more powerful method, those features of the signs against which one wants to discriminate are balanced out, by giving them partly positive and partly negative light amplitudes. It is a well known property of coherent light, but one which was not hitherto used for the purpose of forming holograms, that light can be subtracted by superposing light waves differing in phase by half a wavelength. In the present invention this is utilized by covering approximately one half of the traces of the signs which one wants to reject with a phase plate, producing a retardation of half a wavelength. For instance, an "F" can be discriminated against an "E" by covering the bottom trace _ or "E," which is not present in "F" with a half wave phase plate in the taking of the engram. More elaborate examples will be given later.

As previously stated, the system of the present invention operates in two modes, the first being the mode in which the hologram is formed, which is referred to as the taking mode, and the mode in which the image of a pattern is reconstructed, which is referred to as the reading mode.

In the taking mode the system components include a source of coherent light, preferably a laser, and means for dividing its light into two branches. One branch contains an element referred to as the illuminator plate (such as plate 18, FIG. 1). This breaks up the light into a number of bundles each emanating from a real or virtual point source. It may be realized by means of a lenticular plate, containing as many lenticules as the hologram has engrams, and in the same arrangement. The areas between the lenticules are blacked out. A field lens backing the illuminator plate (i.e., lens 16, FIG. 1) is so arranged that all principal rays passing through the optical centers of the lenticules are focused in the center of a window containing the sign or discriminator. A further lens (lens 20, FIG. 1) is arranged with the lenticular plate in its front focal plane, so that all illuminator waves are exactly or approximately plane when they strike the window.

The other optical branch contains an element to be called the code plate or marker plate (such as plate 36, FIG. 1). This too is a lenticular plate, similar to the illuminator plate, but the point sources formed by this need not have the same arrangement. To simplify the explanations, in all examples to be given later the code plate or a virtual image of it is in the plane of the window, but this, though convenient, is not essential. The code plate or its image occupies preferably only one half of the plane in the window, to avoid confusions with the twin markers.

The two branches of light, that is to say the illuminator waves which have passed through the window and the discriminator in it, and the marker waves which have not passed through it need not be united until they reach the photographic plate, but to simplify the explanations and the device, in all the examples given a common lens is used for both, so arranged that the photographic plate is exactly or approximately in its rear focal plane. This is shown as lens 30 in FIG. 1.

In the taking of the hologram one discriminator or sign after another is presented to the window, with its own discrete illuminator beam and with the marker beam or beams corresponding to one engram. The rest of the illuminator plate, of the code plate and of the photographic plate is covered by masks, such as mask 19 for illuminator plate 18 and mask 37 for marker plate 36 in FIG. 1. Engram after engram is taken in succession, until the set of discriminating engrams is complete.

In the reading mode the system consists of essentially the same elements as in the taking mode and will be described as such, but it may be also simplified, as there is no code plate needed in the reading mode and an ordinary more or less monochromatic light source such as a mercury lamp with a filter may have sufficient coherence for reading. By the principles of holography the reading wavelength need not be the same as that used in the taking. The medium on which the subject sign or discriminator, as previously discussed, is located is a suitable graphic medium such as a film, or typescript or print on a plastic material, or paper made glossy or transparent by oiling which is traversed behind a window. A lens system produces an image of the markers in the plane which is the conjugate of the original marker plate. The markers associated with the sign in the window are observed in small apertures, of convenient dimensions which will be discussed later. These can be read collectively with an electron camera, which scans the whole plane between two consecutive signs, or alternatively, with individual photosensors, one associated with each marker, whose output is fed into logic circuits, known in the art, examples of which will be given later.

The system as described is a powerful discriminator, because the storage capacity of a photographic plate is very large. A high definition photographic plate capable of recording 1,000 optical lines per millimeter, measuring 50 mm × 50 mm can accommodate 2,500 engrams, each with an area of a square millimeter, capable of recording 1,000 × 1,000 data, which is more than sufficient for even the most complicated characters. Moreover each elementary area can accommodate several distinct overlapping engrams, so long as these have distinct marker waves, because in the taking each character-wave interferes only with its own simultaneous marker. The others produce only a background. Hence a single hologram plate can accommodate the discriminators for several fonts, or several varieties of writing.

Referring again to FIG. 1, the system shown accomplishes the result of forming a hologram on a photographic plate, the hologram being formed by a first and second wavefront pattern which, in the embodiment described, one pattern is derived from a printed symbol and the other pattern is produced by a coded array of discrete waveform sources. As was previously described, a single coherent beam from source 10 is split and reflected through separate field lenses (16 and 34, respectively) onto an illuminator plate 18 and a code or marker plate 36, respectively. In describing the action of the illuminator plate 18, reference is made to FIG. 3 which shows the elements in greater detail and with straightened optic paths for clarity.

In FIG. 3, the illuminator beam portion of the coherent light beam is directed through field lens 16 and through illuminator plate 18. The illuminator plate 18, a front view of which is shown in FIG. 4, is a plate containing a plurality of lenticular lenses formed into an array, with the areas between the lenticular lenses being opaque. Each of the lenticular lenses of illuminator plate 18 form an image of the focus, and each emits a separate illuminator beam which will be referred to as a beamlet, of sufficient divergence to illuminate the entire window in mask 27. The field lens 16 causes the central ray of each diverging beamlet to strike the center of the window in mask 27. Thus, the illuminator plate 18 breaks up the light from the source 10 into a number of discrete point sources. The illuminator plate 18 may also be formed from an embossed plastic sheet with the areas between the embossed portions being made opaque. The illuminator plate 18, being fixed in the focal plane of the collimator lens 20, its image is removed to infinity so the beamlets emerge from the collimator lens 20 as parallel beams and the subject sign or discriminator in the window of mask 27 is therefore illuminated by a plurality of parallel waves.

When the entire illuminator plate 18 is masked (as for example, by mask 19 in FIG. 1) with the exception of an aperture 13 over a selected one of the lenticular lenses, the single resultant beamlet will illuminate the subject in the window of mask 27 and be reflected through prism 28 and lens 30 onto a portion of the emulsion of photographic plate 32 which is in the Fourier-plane of lens 30 (shown in FIG. 1). The reflected beamlet will be positioned on a portion of photographic plate 32 (also shown in FIG. 1) corresponding to the location of the unmasked lenticular lens of illuminator plate 18 which produced the beamlet. It follows that if each of the lenses of illuminator plate 18 is unmasked in sequence with different signs positioned sequentially in the window of mask 27 (or at the same time with plural signs in the window of mask 27) a plurality of corresponding portions of the photographic plate 32 will consequently be exposed.

Figure 5:
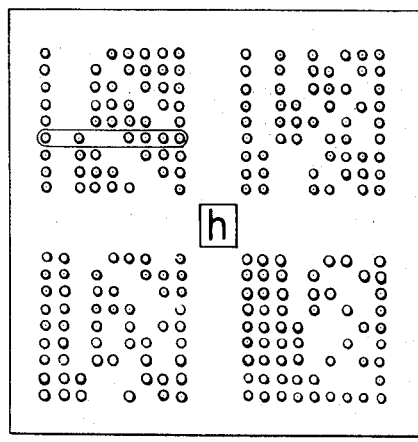
FIG. 5 is a view of a code plate for use in the system of FIG. 1 illustrating an arrangement of codewords representative of characters.

As was previously stated, in reference to FIG. 1 the other portion of the beam from source 10 is reflected through a field lens 34 to a code plate 36 which has an associated mask 37. The code plate is similar in construction to the illuminator plate 18 in that it is an opaque sheet containing an array of small lenses or a similar equivalent. However, the lenses in plate 36 are arranged in coded fashion. This can be seen more clearly by referring to FIG. 5. In FIG. 5, the code words on the plate are represented by the presence and absence of lenses. Each code word consists of nine digits of which three are always blank. There are 35 distinct code words, the 36th code word in the last row at the bottom of the code plate on the right is not included in the code and may be used for checking purposes. The code word which is encircled, for example, may correspond to the letter $h$.

Referring to FIG. 1, the beam reflected by prism 12 passes through field lens 34 and then passes through code plate 36 which is masked by mask 37 as described in relation to FIG. 5 to allow the illumination to pass through only one code word. Thus, six out of nine uniquely positioned discrete light sources are directed to prism 28 and are reflected through field lens 30 onto the emulsion of photographic plate 32 at the same time that a beamlet is being reflected from the subject sign or discriminator in the window of mask 27 through prism 28 and lens 30 also onto emulsion of photographic plate 32. The mask 19 for the illuminator plate 18 and the mask 37 for the code plate 36 are arranged so that reflection from the subject sign or discriminator in the window of mask 27 and the code word being transmitted through the code plate 36 and mask 37 are directed to the same area of the photographic plate 32 so that there is a holographic interference pattern which is recorded on the photographic plate forming a hologram at that portion or area which, being one of many possible holograms which may be formed on the plate 32, is referred to as an engram. For example, if the subject sign or discriminator in the window of mask 27 were a letter $h$ on suitable background material, the mask 37 would be selected so that the code word on code plate 36 representing the letter $h$ will be unmasked. Also the illuminator plate 18 will be masked such that only the lenticular lens of illuminator 18 will be uncovered which will be spatially focused on photographic plate 32 at the same location as the focus of the code word passing through mask 37. Thus, the subject sign which is the letter $h$ is illuminated with a beamlet from illuminator plate 18, the reflection of which is focused onto a discrete position of the photographic plate 32 at the same time that the beamlets constituting the code word for $h$ from code plate 36 are reflected by prism 28 through lens 30 onto the same discrete portion of photographic plate 32 with the result that a holographic engram of the interference pattern between the letter $h$ and the pattern for the code word of $h$ is formed. This procedure can be repeated with a plurality of different subjects, for example different letters or numerals appearing in window 27 along with their associated printed code words selected from code plate 36 resulting in a plurality of engrams being formed on the photographic plate 32.

When photographic plate 32 is developed, it is replaced in the position depicted in FIG. 1 and is ready to be "read." In the read mode the code plate 36 is either completely masked or else the entire marker optics (mask 37, plate 36 and lenses 34 and 12) are removed so that the marker portion of the beam from light source 10 does not reach prism 28. The mask 19 on illuminator plate 18 is completely removed so that all the beamlets emerge from all of the lenses of the illuminator plate 18 and are reflected from the subject in the window of mask 27. When a sign or discriminator used to generate an engram when the hologram was formed appears in the window of mask 27, the beams from the illuminator plate are reflected from it onto the developed photographic plate 32 and an image of the code word associated with that subject is formed by the hologram and may be observed with the observation lens 33.

The system of FIG. 1 is an example of a device which operates by reflected light. Transparencies for use with transmitted light are also suitable for the invention, in particular negative microfilm, with white letters on a black background, but reflected light as described has the advantage that the whole reading device can be arranged at one side of the paper-handling machinery. Ordinary typescript or print on white paper is not as desirable because paper is coarse in terms of wavelengths of light, and the same character typed or printed on different specimens of paper produces different wavefronts. If ordinary paper is to be used, it is preferable not to use it directly but to reproduce the character first by means of a flying spot cathode ray tube scanner or the like on the screen of a device capable of modulating coherent light. Examples of this are the oil-film cathode ray tube, and cathode ray tubes in which the spot modulates polarized light by means of the Pockels or the Faraday effects. It is also possible to use ordinary paper, preferably in transmission, if it is made transparent by oiling, for which an example will be given later. Media suitable for reading in reflected light are negative microfilm or transparent plastic sheets coated with a black layer which is removed by the typing or printing process, backed by a mirror in contact with the face which carries the writing. BUt black-on-white letters and signs can be also read. These are somewhat less suitable, because a "O" and "Q" for instance have much white background in common which does not carry information, hence the signal:noise ratio is unfavorable. But this ratio can be greatly improved if the white, uniform background is eliminated by a mask which cuts out the "zero order diffracted beam." If, as will be explained below, such a mask is applied to the hologram, the sign is viewed by a "dark field method," that is to say the black sign will light up on a dark background. By Babinet's Principle, a black character, with the zero-order light eliminated gives the same diffraction figure as the same character in white, on a black background, apart from a half wave change of phase which has no consequences.

To briefly summarize the operation of the system of FIG. 1, the monochromatic coherent light beam from a source such as a laser is divided by a beam splitting prism 12. The transmitted part is reflected at the reflecting prism 14 and passes in succession through the field lens 16, the illuminator plate 18, mask 19, a collimator lens 20, and a further beam splitting prism 22 to strike the sign carried by the medium which is exposed in the window of the mask 27. The elements as described form the illuminator tract, shown in FIG. 3, which shows the optics straightened out and on an enlarged scale. The illuminator plate 18, whose front aspect is shown in FIG. 4, was described as a transparent plate embossed with lenticules of the same number as there are engrams and discriminators. It is preferably realized as, but not limited to, a plastic moulding with the areas blacked out outside the lenticules. Each of the lenticules forms an image of the focus and emits a beamlet of sufficient divergence to illuminate the window in mask 27. The field lens 16 is such as to make the central ray of each diverging beamlet strike the center of the window in mask 27. The collimator lens 20 is distanced from the foci of the beamlets by its own focal length $f$, so that the diverging beamlets emerge from the lens 20 as parallel beams. In other words, the illuminator plate 18 appears at infinity as seen from the window in mask 27. In the taking of the engrams, preferably only one of the illuminators (i.e., lenses in plate 18) acts at any one time. There is a certain advantage in recording each discriminator simultaneously in four, six, or more engrams, forming a square, hexagon, etc. because this broadens the diffraction base and gives finer marker spots in the reader, but against this stands the disadvantage that the reading of spaced-out engrams requires a higher degree of coherence than the reading of a single engram.

It was stated that lens 30 is arranged so that its rear focal plane, (the Fraunhofer or Fourier-plane) coincides exactly or approximately with the emulsion of the photographic plate 32. Consequently any parallel beam issuing from the plane of the subject sign is focused in a point of the emulsion. Therefore, in the absence of a sign, that is, if the surface of the medium is a plane reflector, any illuminator point is focused in the corresponding point of the emulsion, which is the center of the associated engram. This is the "zero order diffracted beam" and in order to realize the "dark-field operation" previously mentioned it is sufficient to cover up the zero-order spot, that is to say the center of the engram. This is conveniently realized by a zero order mask (previously referred to and shown in FIG. 1 as mask 31) in the form of a photographic plate with its emulsion in contact with the emulsion of the hologram plate, which is exposed to all the illuminator points simultaneously prior to taking the hologram, with a blank space or mirror in the window, developed and put back into position. This practice is necessary in the case of black-on-white signs, but it is also useful in all other cases, because the zero-order beam carries no information, hence it is advisable to block the center of the engrams. The information is entirely contained in the engram area surrounding this central spot.

In the taking of the engrams only a small area around the zero order marks of the illuminator points just being used receives light from the illuminator plate 36, but the whole plate 32 receives light from the code plate 36. It is avoided by using a further mask 29, called background reducer, shown in FIG. 1. This has holes in it, corresponding to the pattern of illuminator points used in the taking of the identical engrams, of a diameter about equal to the size of the diffraction pattern of an average character, that is to say a few millimeters. By changing this, in correspondence with the illuminator mask 19, every time a new set of identical engrams is taken, it is possible to reduce the background to a minimum, and to observe the optimum rule, which postulates about equal light sums on any area from the object and from its codeword.

When the master hologram is complete, it is developed and preferably printed with an over-all gamma of two, and the print is replaced in the original position. In the reading mode the illuminator plate 18 is fully uncovered, while the code plate 36 is completely covered. When a character sign is put into the window of mask 27, its codeword will appear too, in its original position. This has now to be read into a utilization device such as a computer. There are many ways of accomplishing this, of which only two examples will be described.

In the first method a real image of the whole code plate 36, such as shown for instance in FIG. 5, is formed with the observation lens 33, shown in FIG. 1 in dotted lines, and this image is projected on the screen of an electron camera (not shown). The pattern is stored on the screen of the electron camera, and is scanned by an electron beam, preferably in such a way that a scan is completed in a little less than the time taken by one character. The output of this camera is sent first of all through a level discriminator, which will record only pulses safely above the noise limit. From then it is sent into a store, such as for instance a random access core store. This records all the pulses which the level discriminator has let through, but unless six pulses have been obtained from one line, the record will be erased as spurious. If six pulses have been counted, the record is accepted and transferred into the computer.

If this scanning process is carried out at a random time, it might happen that a codeword is scanned somewhere near the beginning of the phase when it flashes up. At this time the charge on the camera screen has not yet grown to its full level, and the codeword might be rejected by the level discriminator as spurious. The scan must be therefore synchronized with the flashes, whose maxima occur always at the instant when a character is in the center of the window. This can be achieved for example by splitting off a part of the total light sum which goes into the codewords, and direct it into a photocell. This cell will sense the maximum of the flashes, and starts the scan with a delay of perhaps 0.15 of the character period, which is then completed in perhaps 0.7 of the said period, before the next flash starts.

It is advantageous to clear up the image on the electron camera secreen by an intermediate image, which carries a mask corresponding to the codeword pattern, with very fine holes. The reason for this is, that the light intensity in the center of the codepoints is very high, but the total light sum of a point need not be very large. It is possible to record 5–10,000 fringes on a photographic plate of 50 × 50 mm, so that the definition is of the order 5–10,000, and a code-point is correspondingly small. As the spot size in electron cameras is not likely to be less than 1/1000 of the field, without the mask the spot might pick up noise in an area perhaps 100 times larger than a code spot, and this might impair the performance.

In a second method of reading, the light in any column of the code array is summed up and led to a separate photoelectric device. This can be done for instance by arranging a number of plastic light guides with elongated receiving cross sections across the mask described in the previous paragraph, each light guide leading to its own photoelectric device. Each of these now records one position in the code. The same effect can be also achieved instead of with light guides by an optical device sometimes called a "fly's eye." This is a lenticular plate, with one lenticule per codeword, or at least one per column, whose optic axes are so staggered that the images of the code points in one column are brought together in a small area, while the images of the columns are separated, so that they fall on the receiving aperture of the photoelectric devices. In the case of the code shown in FIG. 5 a minimum of seven such detectors is required, though it is again safer to use also the two outside columns for confirmation. Each of these detectors has a level discriminator, so that it rejects light pulses below a certain level, and an output limiter, so that when a light pulse is accepted a standard pulse is sent out. These are added up in a discriminator, which will get into action only if there are six simultaneous pulses. If these appear, the pulses of the photocells, provisionally stored in a temporary store, are directed into the computer. This method requires simpler apparatus than the one previously described, but it has somewhat less discriminating power, because it senses only the light sum in each column instead of each code point separately.

The mathematical theory of the composite hologram is somewhat complicated, but an order of magnitude estimate of the discriminating power can be obtained in a simple way. The theory shows that the best results are obtained if each engram is produced in such a way that the area used for the engram obtains about equal light sums from the illuminator and from the code plate. In that case in the reconstruction about one half of the light will appear in the object, one quarter in the reconstruction of the codeword, and one quarter in the Fourier-twin of it, which is in general washed out, and useless for recognition purposes. Hence if there are 1,000 different engrams in a hologram, any one of them will throw up to 1/4000 of the light into its codeword. This is under the cautious assumption that the engrams in one layer do not collaborate at all. Making some allowance for imperfections, and considering that the light in a codeword is distributed between around 10 code points, we thus obtain $10^{-5}$ of the light in one code point. But with 5–10,000 fringes across the hologram, and in the mean at least 1–2,000 fringes over one set of identical engrams, the definition of a code-point is of the order of $0.5 - 1.10^{-3}$ of the width of the code pattern, that is to say the light is concentrated into $0.25 - 1 \times 10^{-6}$ of the area. Combined with the fact that the background is much reduced over the area in which the codewords are observed, it is seen that there is a good signal-to-noise ratio at least of the order $10 - 20$ in every code point. It is seen therefore that a discrimination of the order of 35 characters, each with thirty varieties is well within the storage capacity of a fine grain photographic plate of the order of 50 × 50 mm.

Figure 6:
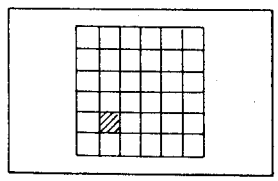
FIG. 6 is a representation of a hologram plate for use with the system of FIG. 1 designating a discrete position associated with a selected codeword.
Figure 7:
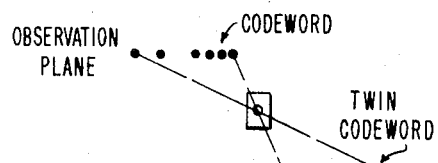
FIG. 7 illustrates a representation of light signals in the observation plane of FIG. 1 for the code plate and hologram of FIGS. 5 and 6.

The operation of the present invention can be further explained with reference to FIGS. 5 through 10. FIGS. 5, 6, and 7 illustrate the simple case in which a single engram, or a group of identical engrams is associated with any one sign of the set, and gives sufficient discrimination. In this case a group of markers may be associated with any one sign, so as to form a codeword in the machine language. FIG. 5 is an example of a code-plate in which each codeword has nine digits of which three are blank. There are 35 distinct codewords, the 36th in the last row at the bottom, right is outside the code and may be used for checking purposes. The line which is circled may correspond to the sign h. In FIG. 6, which is a representation of the hologram plane, this may correspond to the shaded engram, that is to say this engram is marked with the marker beams issuing from the illuminator points which are associated with h. In the reading, when a letter h appears in the window of mask 27 (FIG. 1) only the row corresponding to h will show in the observation plane, that is to say in the plane in which the marker beams are focused, the full complement of six luminous points and three blanks as illustrated in FIG. 7. In addition the twin codeword appears, in a central symmetrical position. To avoid interference of the twin code word with other codewords, the window in FIG. 5 may be placed slightly asymmetrically, so that the twin codeword can be obscured by a background reducer (mask 29 in FIG. 1) mask, which is perforated only in the positions in which code-points can appear.

This simple case has advantages in the read-out, because the rows can be consecutively scanned for instance by an electron camera, as previously described, with a full scan between two letters, which feeds the data, that is to say the light signals into a temporary store, from which only the one item is fed into a computer which has the full complement of six luminous points and three blanks. But it is applicable only in the somewhat exceptional case of clearly distinguishable signs.

FIGS. 8, 9, and 10 illustrate another scheme, which is applicable to more difficult sets of signs. FIG. 8 shows the codeplate, in which the markers associated with a sign such as h are distinguished, four by black dots, one by a strongly ringed blank spot. Each of these corresponds to one engram in the hologram, as shown schematically in FIG. 9. The engrams in FIG. 9 indicated by four shaded areas give a positive response to h, the fifth engram, distinguished by a thick frame, gives a blank. Correspondingly, as shown in FIG. 10, four luminous points and one blank appear in the observation plane, in positions homologous to the positions of the five markers in the marker plane. These are observed by individual photosensors 41, 42, 43, 44, and 45, and the four "yes"-es and the one "no" are fed into a logic circuit 46, which then produces a distinctive signal or codeword indicating that the sign was an h. A description of logic circuit 46 and the recommended rules for arranging the markers will be given later.

FIGS. 11 and 14 illustrate embodiments of hologram taking and reading devices for transmitted light, which are different from those previously described and have the advantages of simplicity and better light economy. In FIG. 11, which is the taking device, the light from a laser is focused in a point L. A semi-reflecting mirror 48 forms of this a mirror-image L', while the transmitted part falls on a spherical mirror 50 which produces the real image L'', in a center perforation of an illuminator plate 52. L' serves for the illumination, L'' for the marker beams. The light from L' goes through the field lens 54, the code plate 52, and the collimator lens 56 to the window 58 which contains the discriminator which is preferably contained on a photographic plate, and which will be expalined in more detail below. The rest of the illuminator tract is the same as in the previous example. The light from L'', in the central perforation of the illuminator plate 52, falls through the lens 56 on the code plate 60 which in this example occupies only the lower half of the plane in which the discriminator is presented. A stop in a transparent plate 62 prevents light from L'' from reaching the window 58. The rest of the marker tract is the same as in the previous example, and the background reducer mask 64, the illuminator mask 70, and the zero order mask 66 have also exactly corresponding functions with respect to hologram plate 68.

FIGS. 12A, 12B, 12C, and 12D show several varieties of illuminator plates. As shown in FIG. 12A, the illuminator points are arranged in a hexagonal pattern for best utilization of the hologram area. FIG. 12B is the profile of the plate of the same type as before, with small positive lenticules. FIG. 12C shows a plate having negative lenticules. FIG. 12D is a plate with improved light economy. The lenticules are larger, so as to cover almost the whole area in the hexagonal arrangement of FIG. 12A so that only a small part of the surface has to be blacked out. FIGS. 13A and 13B illustrate the code plate which is similar to those previously described.

In the reading device, FIG. 14, the arrangement of the illuminator plate 52 and of the lenses is the same, but the illumination is now in a straight line from a source 72, which need not be a laser, but can be, for example, a mercury lamp with a filter, projected on a pinhole. The code plate 60 and the masks are removed, and the discriminator is replaced by the film 74 which is to be read. A lens system 76 is added which produces an image of the plane previously occupied by the marker plane in the observation or "decoding" plane. This plane is masked by a mask 78 which has small apertures corresponding to the position of the marker images. whose size will be specified later. Each aperture is fitted with an individual photosensor such as photosensor 80. As these cannot be reduced below a certain size, and as large magnification of the marker plane would result in an unduly long apparatus, fiber optics may be used for guiding the light from the marker aperture to the individual photosensor.

It was stated that an image of the sign itself is produced in the observation plane, where it intersects the optic axis. This may be utilized, as will be shown later in an example, for monitoring and correcting the position of the line which is being read, also for monitoring the light intensity, and for giving the signal for "no sign." The twin marker, which appears in the lower half of the observation plane, is utilized only in the exceptional case of center-symmetrical signs such as S, Z, or H, or not at all.

For simplicity the reading device of FIG. 14 has been shown as having the same optics as the taking device of FIG. 11, but this is not necessary, nor, in general very convenient. Optical equivalence is sufficient. The taking device and the reading device are tied together by the same hologram, that is to say corresponding signs must produce in both the same diffraction figure. It is convenient to make the discriminators used in the taking device rather large, in order to make sure that they are correct in every detail. In the reading device a small size is convenient for instance microfilm, to keep the cost of the medium down. Standard size typewriting for instance can be reduced about thirty times on high-definition microfilm, in which case the focal length of the lens 82 in FIG. 14 can be 30 times smaller in the reader than in the taker if normal typescript has been used in the taker. The wavelength used in the reading device need not be the same as in the taking device. For instance 6328 A of a helium-neon laser may be used in the taker, and the green mercury line 5461 A in the reader. In this case the focal length is to be reduced not 30 times but $30 \times 5461/6328 = 25.7$ times, because the shorter wavelength is diffracted at a smaller angle.

The reading device may differ from the taking device also in other respects. Reading can be done at a faster rate than the medium can be moved behind a window, for instance at the rate of 20 lines per second. In this case it is convenient to illuminate a whole line of the film in the reader, and image it on a moving aperture which scans the image of the line in 50 milliseconds. It is then the plane of the moving aperture-mask which takes the place of the film 74 in FIG. 14. The rest of the reading device need not be changed, because the lens 82 moves the image of the sign to infinity, and the illuminator is also optically at infinity, hence the diffraction figure will appear on the same engram, whatever the position of the moving aperture. As the lines have to be scanned in a straight line the aperture-holes are preferably arranged not on a disc, but on the periphery of a drum. The small departure of the aperture from a plane, owing to the curvature of the drum is of little importance, and can be further minimized by conforming the drum to the curvature of the field of the lens which images the line on the film on the drum.

An important feature of the present invention is the use of discriminating engrams. These emphasize the differences in the light signals between signs to be accepted and signs to be rejected by using the differences in the shape of the signs for reducing the light signal for the wrong sign, while affecting the signal for the right sign as little as possible.

Consider first the case in which the light signals are observed in apertures in the observation plane, in the same positions in which the image of the marker point-sources would appear if these were present. The theory shows that it is convenient to make the diameter of these observation apertures equal to or a little more than the mean thickness of a line in the set of signs to be read. For brevity this will be called a "small aperture." Another result of the theory is that in the device of FIG. 1 the engram acts like a template; almost equivalent to a template in the form of the sign with which the engram was taken, placed over the window in the original position. But it is a template very different from those which have been used before for character recognition, in non-coherent light. The light collected by the small aperture is proportional not to the overlapping areas of the original sign, say A, and of the sign presented to it in the reading, say B, but to the square of this area. The reason is that the light amplitudes in the small aperture are in phase and proportional to the overlapping areas of A and B, and the light intensity is proportional to the square of the sum of amplitudes. This in itself is an advantage. Take as unity the light signal which appears in the small aperture when the engram for A is presented with A. If, for instance, B overlaps with A in the position of best coincidence on one half of the area, the signal will be not one half of that for A, but one quarter. As regards the nonoverlapping parts of A and B, the theory shows that this part of the light is scattered outside the small aperture.

Though this in itself is an advantage, it could happen that B covers the whole area of A, for instance an "I" could completely cover a $l$. This ambiguity is avoided by the use of discriminating engrams, whose construction and operation may be briefly described as follows.

Take a letter A which must be distinguished from letters B, C, ..., some of which have considerable overlap with A. These must nevertheless differ in some feature from A, otherwise the eye could not distinguish them either. Construct now discriminating engrams with signs A', A'', as follows. Print A and the sign, say X from which it must be discriminated over one another, in the position of maximum overlap. Compose from this the sign A' by giving these parts of X which do not overlap with it negative values. The physical process by which negative values can be realized will be explained below. Assuming for the moment that this can be achieved, the engram of A' when presented with X will give an amplitude sum proportional to overlapping areas of A and X less areas of X projecting beyond A. The light signal intensity will be proportional to the square of this difference. As an example assume that X overlaps two-thirds of the area of A, and that the part of X projecting outside this is one-fourth of the area of A. The engram A' thus constructed will give the full unit response for A, but only $(0.667-0.25)^2 = 0.417^2 = 0.174$ for X, which is a safe margin. But we can make it even safer by cutting out one-fourth of A in that part of A which is common with X. This gives the response of $0.75^2 = 0.56$ for A, but 0.028 for X, a ratio of 20:1.

It may now be described how certain areas of A' can be given negative values. This is done by reversing the phase of light in the said areas relative to the rest. As has been explained before, if the engram is taken with a simple transparency, all amplitudes will be in phase in the small observation aperture. We now produce the discriminating engram of A' by covering the said areas of A' with a transparent plate which causes a delay or advance of phase of half a wavelength. It does not matter which: the phases are reversed in either case. Such a stepped plate is known in the art, and can be produced by exposing a fine-grain emulsion with a certain light sum, and bleaching it. The emulsion then becomes fully transparent, but retains steps of a height which can be very accurately controlled by the exposure. This plate is then put in contact with the transparency of A + X, in which if necessary a fraction of the overlapping parts is obscured, during the taking of the engram. Both the transparency A + X and the stepped plate can be conveniently produced by photographic reduction of sufficiently large-scale drawings.

Examples of such discriminating engrams, also some which discriminate a sign against more than one other sign, will be described later. There must be enough such discriminating engrams for any sign A so that any sign X other than A is rejected by at least one of them.

In a small observation aperture, such as has been assumed so far, a strong light signal flashes out at the instant of the full overlap of a sign with itself. There can be several smaller flashes when another signal is presented to the engram, for instance V to the engram of A, but these can be strongly reduced by the method as described. A small observation aperture, with a diameter equal to or a little more than a line thickness would be fully sufficient for discrimination if one could be certain that the signs will have exactly the correct height adjustment when the text to be read is drawn across the window, because in this case there will be an instant of full coincidence. In order to understand what happens if the height adjustment is not exact, it will be necessary to state a few further results of theory. When a sign completely coincides with itself, all the light emitted will be contained in a marker spot with a diameter of twice the line thickness, with a sharp maximum in the center. if now the sign to be read is moved out of coincidence, by a step which can be in any direction, the marker spot will split up. One spot, corresponding to those parts of the traces which remain in coincidence stays put, but a second marker spot appears, of the same shape as the first, displaced from it by the same distance and in the same direction as the signs. The amplitudes in each spot are in phase, but the amplitudes of the two spots are not necessarily in phase with one another. However, for small displacements, the phase difference is small, except in the case when the illuminating wavefront happened to be parallel to the lines which have now separated. If this is avoided, the total sum of amplitudes as collected by a wider aperture which admits both marker spots will be almost the same as at complete coincidence. The case to be avoided may be illustrated by the letters E and F. In this case a horizontal line is the distinctive feature. One must therefore avoid illuminating the engrams which discriminate these two letters exactly from above or exactly from below, otherwise there will be a considerable drop in the signal intensity when the vertical adjustment is not perfect.

It appears therefore that a wider observation aperture has certain advantages, because it collects more light, and gives a response also to near coincidences. But a wider aperture also collects more stray light, and in any case it would not pay to make it wider in horizontal direction than the difference between the widest letters and the window. A horizontally wide aperture has also certain disadvantages for the design of discriminating engrams, which will be illustrated later. On the other hand it is advantageous to make the window wide enough in the vertical direction to accommodate the displaced spot if the vertical height adjustment is not perfect. It is therefore preferable to make the observation windows elliptical, with the long axis in the vertical, and equal to the short axis, augmented by the expected vertical misalignment.

The somewhat lengthy mathematical theory of the optical phenomena which occur in the devices according to the invention need not be presented herein, but a brief summary of its results is included hereinbelow to provide an understanding of the operation and the measures undertaken for its improvement. The basic result of the theory is that the engram of a sign acts approximately like a template, that is to say like a transparency of the original sign superimposed on the sign which is presented in the window, but with certain important differences which will be explained step-by-step. A coincidence of this "virtual template" with the sign results in an addition of light amplitudes in the marker image.

FIG. 15A shows six stages of an "A" traversing its own virtual template. The coincident area is shown dark. The common area in FIG. 15A is plotted in FIG. 15B (to the right of the peak value) as a function of the relative displacement. The resulting light intensity flash is even steeper, because the intensity in the case of amplitudes added up in phase is the square of the sum of the amplitudes, that is to say proportional to the square of the concident area.

FIG. 16A shows six stages of the template of "A" being presented with the letter B. It is seen in FIG. 16B that the maximum coincident area is about three times less then in the case A—A, hence the maximum intensity about nine times less.

FIGS. 17A through 17F explain in more detail what happens in the process, and explains also the important differences between a real template, as often proposed for character recognition, and the virtual template which is the equivalent of an engram. FIG. 17A is the letter F in full coincidence with its own template. FIG. 17B shows the phenomena which appear in the observation plane, inside the marker aperture. In this case a marker spot appears in the original, central position, which carries about one half of the total light energy diffracted into the marker beam. The other half appears in a halo, but this is distributed over an area up to four times that of the image of the window, and its energy inside the small marker aperture is so small that it can be left out of account. The maximum diameter of the marker spot is equal to the sum of the line thicknesses of the template and of the sign, but the light distribution inside the spot is strongly peaked.

FIG. 17C shows the letter F shifted by the distance $d'$ to the right, relative to its virtual template. Coincident areas are shown shaded. As the theory shows, these produce a marker spot in the original central position, but as the coincident area is now only about one half of the maximum, the amplitude sum in this spot is now also about one half of the maximum. The essential difference between a real and a virtual template manifests itself now in the appearance of a second marker spot. In order to understand this, in FIG. 17C the lines of equal phase of the marker beam are shown in slanting lines. These are the intersection lines of the wavefronts of the marker beam with the plane of the window. Wavefronts of equal phase are spaced by one wavelength from one another. Let the angle of the wavefront with the window plane be for instance 0.1 radian; then the lines of equal phase will be spaced by 10 wavelengths. There would be about thirty of them across the normal line width of a standard typewritten sign, and about one if the sign is thirty times reduced. The theory shows that points in the template and in the sign which is presented to it which are on a line of equal phase produce a marker spot of the same phase as the original, but with the difference that the new marker spot is now shifted realtive to the central one by the distance $d'$ by which the points are spaced measured along the line of equal phase (see FIG. 17D). As in the case F—F all noncoincident but phase-equal point pairs have the same distance $d'$, all the amplitude of the noncoincident areas is concentrated in one marker spot. In the case as shown this carries about one half of the maximum amplitude sum. But though the two spots are coherent and equal in phase, they are spatially separated and therefore their intensities are added and not their amplitudes. The light intensity in this case has therefore dropped to one half of the maximum.

One can sum up briefly by saying that in the case of a sign shifted with respect to its own virtual template the light in the marker aperture does not vanish abruptly, but is gradually reduced by its components dropping out of coherence. One may use this for improving the discrimination, because if the wavefronts are exactly or nearly parallel to the trace in question the drop is very rapid. On the other hand if one requires a certain tolerance in the position or in the shape of the letters, one must arrange the wavefronts at a not too small angle to the wavefronts. These are the principal rules for the allotment of markers to signs.

An example of the application of these rules is shown in FIGS. 17E and 17F. The letter F is here shifted vertically with respect to its own template, by a little more than a line thickness. The lines of equal phase are shown slanting at 45° to the horizontal. As the two marker spots still partially overlap, the intensity in this case does not drop to one half, but is nearer 0.6. Even better results can be obtained with nearly vertical lines of equal phase; about 0.7 for a shift of the whole line thickness. This, by the criterion to be discussed later is sufficient to recognize slightly dispalced signs.

In order to strike a compromise between sharp identification and the recognition of slightly displaced or misprinted signs, it is expedient to make the marker apertures about three line thicknesses wide, with about the same height, approximately as shown in FIG. 17.

As previously discussed in general terms, for the safe discrimination of all but somewhat exceptional sets it is not sufficient to produce a single engram with the sign itself, but it is necessary to construct several engrams with appropriate discriminators. This may now be explained in an example where it is desired to distinguish the letters E and F from one another, and also to discriminate against the letters H, I, L, and T which are also composed of horizontal and vertical traces. As a discriminator for E the pattern is selected shown in FIG. 18A which has two lines, of the same sign, as indicated by shading, though they are really transparent lines on a dark background as shown in FIG. 18B. This discriminator will accept E but it will reject F, also I, H, L, and T which can cover at most a little more than half the area. As previously explained, this discriminator will give also full light intensity for an E which is vertically displaced, provided that the lines of equal phase are not too near the horizontal.

FIGS. 18C and 18E show the two discriminators which are necessary for distinguishing F. In FIG. 18C the discriminator has two horizontal bars, but these are of opposite sign, as indicated by shading one and leaving the other empty. Physically this means fitting one or the other with a half wave retarding plate; it does not matter which. As shown in FIG. 18D, this discriminator will reject E, whose two bars exactly compensate one another, but it will accept F. However, it will also accept L and T. In order to discriminate against these two, the discriminator of FIG. 18E must be added as a further discriminator. This responds the central bar in F, but will not respond to L or T. It will respond also to E and H, but as these have been already rejected by the discriminator of FIG. 18C, the discrimination is complete.

It may be seen from these examples, and even more clearly in some later ones, that the areas in these discriminators can be very different, which means that without further precautions they would give "yes" signals of very different strengths. These may be equalized either by different exposure of the engrams, shorter for large discriminator areas, longer for small ones, or by backing the observation apertures with a photographic plate. If this is exposed to the "yes"-es and developed as a negative with a gamma of unity, the signals transmitted through the plate will be equalized. The two methods can be used also in combination.

FIGS. 19A and 19B illustrate the physical method by which such discriminators may be realized, exemplified for the discriminator of FIG. 18C. First a photograph is taken of the discriminator of FIG. 18A and developed. Second, a phase photograph is taken of the lower bar alone, and processed by exposing a fine-grain emulsion with a certain light sum and bleaching it. Alternatively, the phase plate can be produced by carefully controlled etching of a glass plate covered with a photoresist. The two plates are ultimately united. It may be noted that the surface of the negative in FIG. 19A will be by no means exactly plane, because emulsions processed in the ordinary way show thickness differences fiarly proportional to the exposure, but as the lower and the upper bar have received equal treatment, the difference in optical paths will still be one half of a wavelength.

As these discriminators have rather fine details, it is convinient to make them on a rather large scale. This, however, has the disadvantage that the diffraction angles become very small, and in the optical systems as shown in the previous examples the focal length would have to be made very large. This is remedied, as shown in FIG. 20, by placing in front of the discriminator 90 a reducing optical system, for instance a microscope objective, which reduces the size A—B to the smaller A'—B' and enlarges the angles in the inverse proportion.

FIG. 21 contains examples of logic circuits which may be used for processing the information supplied by the discriminators. The blocks at the left symbolize the discriminators and their individual photosensors. In FIG. 21 the simplest case is the one in which a signal from the X sensor 92 means a "yes" to a sign X and a "no" to everything else. In this case the sensor operates a trigger circuit, here symbolized by a simple switch 94. The upper position means "no," the lower one "yes."

The next case is the one when a positive response of a first discriminator means 96 is provided for "X or Y," which is written as usual X$\nu$Y. In this case another discriminator 98 is required of the type whose positive response means "X, not Y," spelt X, $\overline{Y}$. A discriminator Y,$\overline{X}$ would equally decide the dilemma "X or Y."

The next case is a trilemma, in which the positive response of the sensor means 100 for "X or Y or Z." This is then decided by three binary discriminators 102, 104 and 106 for X,$\overline{Y}$, X,$\overline{Z}$ and Z,$\overline{X}$, respectively.

The resolution of a trilemma X$\nu$Y$\nu$Z signal from sensor 108 by means of a discriminator 110 for X,$\overline{YZ}$, whose positive response means "X, not Y or Z," and by a binary discriminator 112 for Y,$\overline{Z}$. Logic circuits for more complicated cases may be constructed by rules well known in the art.

FIGS. 22 through 25 are further examples of discriminators. In the case shown in FIGS. 22A through 22C an "O" has to be distinguished from a "0" of somewhat narrower shape, but with the same height. A solution is shown in FIG. 22C. An "O" dragged across the shaded template marked with p to mean positive gives a large flash. On the other hand the zero, though it coincides to a large part with the p area, will subtract either one or the other of the two negative vertical bars marked n and will therefore produce a much smaller response.

FIG. 23 illustrates the particularly difficult discrimination between l and "I," which differ only in a serif. The discrimination is made by first of all cutting out all coincident parts, as indicated by the hatched outline. On the other hand the distinctive serif of unity is given a positive value, and a flag is added such that in the positive of maximum coincidence, as shown in FIG. 23C, the unity sign gives a positive response, while I, in the same position, and also to the right and left of it, gives a very small or zero response, as shown in FIG. 23D.

FIG. 24 illustrates another difficult case, the discrimination between "O" and "Q". FIG. 24A is a discriminator wich responds to "Q" which not to "O," because for "O" the top and bottom halves balance out. FIG. 24B is a discriminator which responds to "O" but not to "Q," because for "Q" the parts around the stroke balance out, while for "O" an unbalance results. The discrimination can be made sharper by leaving out the side flanks of the letters in both patterns.

A further discriminator between "O" and "Q" can be constructed by making use of the fact that "O" is central-symmetric, while "Q" is not. The mathematical theory shows that for central-symmetrical signs the marker and the twin marker are exactly symmetrical. Hence if identical discriminators are placed in the position of the marker and its twin, these will give a non-zero difference for an asymmetrical sign such as "Q."

Another method of discriminating between signs which have only small differences is illustrated in FIG. 25. A 2 and a "Z" differ only slightly, especially in certain fonts and styles. But the single slanting line in FIG. 25C with the marker lines of equal phase parallel to it is a powerful discriminator, because it will give a strong flash only for the "Z," not for the 2. In this case too the comparison with the twin marker also adds a discriminating feature, because "Z" is central-symmetrical while 2 is not.

FIG. 26 illustrates a preferred standard for discrimination. A "yes" response must give a light intensity flash at least four times larger than a "no," for a standard letter. This means that the maximum coincident area, resulting by subtracting positive and negative areas in the discriminator, must be at least twice as much for the accepted sign than for a rejected one, because the coherent amplitudes must be squared to give light intensities. The decision level at which the "yes-no" circuit is triggered off or not is then set at one half the standard "yes," i.e., twice the standard "no." This leaves a latitude of 2:1 for off-standard or misprinted signs. Higher safety factors can be achieved, at the expense of using more discriminators.

FIG. 27 is a table of discriminators which may be used to distinguish the 10 numerals 0 to 9 and which satisfy the above criterion. Each row contains those discriminators which accept the numeral at the left, but reject the numeral in the column of the discriminator. Conversely, the columns contain all the rejectors. The diagonal contains the numerals themselves. There is no necessity to use these too as discriminators, because the others in the same row will achieve all the sorting, with the exception of 7 which is a sufficient discriminator in itself against all the other numerals.

Some of the discriminators appear only once in one row, for instance 5–6 and 6–5, others, for instance, 0–5 and 0–6, or 0–8 and 0–9 are identical. For those which occur twice in one row only one engram need be made. Counting these only once, we obtain for the number of discriminators for the set of the ten numerals:

Numeral 0 1 2 3 4 5 6 7 8 9
Discriminators 2 1 1 2 1 3 3 1 3 4
altogether 21 engrams. These are still logically redundant, because by using a somewhat more complicated logic, we could leave out all those discriminators which are below tye main diagonal, and which do not occur at the right of it. The reason is that if one uses only th discriminators in and above the diagonal, these have already responded "no" to the question whether a number could not be mistaken for one of smaller value, hence one can confine the question to those larger than the given number, and these are at the right of the diagonal. This way one can reject seven of the discriminators, and arrive at the minimum number of 14.

Similar considerable economies can be achieved also in the discrimination of letters. For instance if the problem is to recognize the capital letters, one can first separate the group which contains only horizontal and vertical traces, E,F,I,H,L, and T, and the group which contains slanting straight lines, A,K,M,N,V,W,X, and Z, which leaves only 11 for the group which contains curved lines.

Having now described the optical and logical principles of the devices according to the invention, an example may be given of how to combine these with the paper-handling machinery, which is necessary except in the case when the material to be processed is first copied on microfilm or the like. FIG. 28 is a device for the high-speed reading of normal size print or typescript. As far as the optical and electronic components are concerned systems such as described can read signs at the rate of 2,000 per second or more, but this means about 20 lines or more per second, and paper cannot be readily traversed to-and-fro at this rate. In the device illustrated in FIG. 28 the paper is scanned helically, line after line on a rotating transparent cylinder 120. As this rotates at 20 or more revolution per second, and can read a page in 2 seconds or less, it is not possible to arrest the rotation after each sheet. The cylinder 120 therefore is kept rotating continuously. It moves forward in axial direction during the scan, and then back during the period when the scanned sheet is rejected and a new one introduced. There is no difficulty in reversing the axial motion, for instance by a left thread 121 and a right thread 123 with alternatingly clutching nuts 122 and 124, as illustrated.

The sheets must be introduced at such an angle that the lines form helical lines on the cylinder, with a pitch equal to the line spacing, so that one line closes with the next. This is achieved by means of a slightly inclined slide 126 and a pressure roller 128, also inclined relative to the generator lines by the pitch angle. Plastic transparent material is preferable, but ordinary paper can be also used if it is wetted with a liquid, such as an oil, with a refractive index very close to that of cellulose. At the reading point R an area somewhat larger than a letter is illuminated by an optical arrangement essentially identical with that in FIG. 14. In this area the paper is pressed against the cylinder 120 by the transparent rotating disc 130. This is slightly thickened at and near the radius of R, so that it does not make contact elsewhere. The axis 131 of the disc 130 is above the generator line passing through R so that the radius drawn from the axis to R forms the pitch angle with the generator. This ensures that the motion of the disc at the point R will be tangential to the helix, so that the paper is pressed between two transparent members which move with it. The pressure is provided by the two pressure rollers 132 and 134 above and below R. The pressure on the cylinder 120 is taken up by the ring of pulleys 136 which move axially with the cylinder. Excess oil is squeezed out of the paper and is centrifuged off by the rotating disc 130 in a nearly vertical direction, downwards.

After leaving the reading area R the illuminating beam passes through a lens 138 which images the reading area on the plane of the mask 140, preferably demagnified, so as to make the optical device short, as previously explained in connection with FIG. 20. The mask 140 carries a window 142. In order to make alignment of the typed or printed lines with the window automatic, the mask 140 is servoed for axial movement by means of the two servoing photosensors 144 and 146, which are arranged in the center of the observation plane 148. The photosensor which gets more light pushes the line away from it. In order to ensure that the first line in a sheet is adjusted correctly, it is expedient to provide a second window (not shown) in the mask which is one line ahead, that is to say in the present case to the right of the principal window, and to operate the servo system from the light transmitted by this window. The servoing photosensors 144 and 146 may be also used, as previously mentioned, to provide the signal for blank spaces. In order to save space on the medium on which the code is ultimately transcribed, such as a magnetic tape, arrangements may be also made to stop the said medium after a number of blanks which indicate the end of a line or blank lines. The rest of the optical system is as previously explained.

What has been described is an invention in the art of optics, particularly the technology of holography. It was shown how holograms could be formed from first and second waveform patterns such that, after developing the hologram, an image of the first pattern is produced when a pattern corresponding to the second pattern is directed onto the hologram, and vice versa.

The image pattern which is reconstructed is viewable with an observation lens, or may be detected by photosensors.

An example of one area of use for the present invention, namely character recognition, was described in detail, with particular embodiments of optical systems and elements being shown. Further, a technique was described wherein a number of separate holograms, termed engrams, could be formed on a single holographic plate, either adjacent or overlapping. In this regard a feature of the invention was described which taught how the engrams for letters and numerals could be formed by using discriminators which are designed to enhance or reinforce distinctive differences in light signals between characters to avoid confusion or the recognition of erroneous characters. The discriminators employed the use of phase reversal of light in relative areas of the discriminator patterns, for example, by use of a stepped transparent plate which causes a phase delay of light.

It should be understood that the present invention may be adapted to other areas besides that of character recognition. For example, the present invention could find use in air mapping or reconnaissance operations for terrain identification or to detect camouflage. It should be apparent that there are these and many other graphic arts applications to which the present invention may be applied.

While the invention has been particularly shown and described with reference to preferred embodiments thereof, it will be understood by those skilled in the art that various changes in form and details may be made therein without departing from the spirit and scope of the invention.

What is claimed is:

1. An optical character reader comprising:

a hologram having a plurality of interference patterns photographically recorded thereon, each interference pattern being formed by the interference of first and second associated electromagnetic wavefront patterns, said first wavefront patterns emanating from said characters and said second wavefront patterns emanating from groups comprised of a plurality of discrete and separate point sources of electromagnetic wavefronts where each said group forms a unique code representing a different one of said characters, a display means including a medium containing a plurality of saie characters, said characters being related to said first electromagnetic wavefront patterns which formed said interference patterns of said hologram, a source of substantially coherent light, means for sequentially positioning said characters on said medium in the path of said coherent light, each of said characters scattering said coherent light into electromagnetic wavefronts, said electromagnetic wavefront patterns from each of said characters being related to said first electromagnetic wavefront patterns which formed said interference patterns of said hologram, an optical system for sequentially directing said electromagnetic wavefront patterns scattered by the characters on said medium onto said hologram, said electromagnetic wavefront patterns scattered by said characters and sequentially directed onto said hologram coacting with said interference patterns on said hologram to produce images of said second associated electromagnetic wavefront patterns emanating from said discrete point sources, said images being representative of said unique codes of the characters on said medium, and means responsive to each of said images of said second associated electromagnetic wavefront patterns to produce electrical signals representative of said codes of the characters on said medium.

2. An optical character reader according to claim 1 wherein produced images of said second electromagnetic wavefront patterns are manifested as coded discrete light arrays, and said means responsive to each of said images is a plurality of photoelectric devices for producing electrical signals in response to said coded discrete light arrays.

3. An optical device, comprising:

a hologram formed by the interference of first and second electromagnetic wavefront patterns on a recording medium, said first pattern being comprised of electromagnetic wavefronts emanating from a subject and said second pattern being comprised of electromagnetic wavefronts emanating from a plurality of discrete and separate point sources of electromagnetic wavefronts, said plurality of point sources forming a code associated with said subject, means for irradiating said hologram with a pattern of electromagnetic wavefronts corresponding to said first pattern to produce an image of said second pattern of electromagnetic wavefronts, means responsive to each electromagnetic wavefront in the image of said second pattern for producing electrical signals coded in accordance with said code associated with said subject.

4. The device of claim 3, where said means for irradiating said hologram includes a medium containing said subject and a source of substantially coherent electromagnetic radiation, said subject being located in the path of said electromagnetic radiation from said source and scattering said electromagnetic radiation, said means for irradiating further including means for directing said scattered radiation to said hologram to coact with said interference pattern of said first and second electromagnetic wavefronts, producing said image of said second electromagnetic wavefront pattern.

5. An optical device, comprising:
   a hologram having a plurality of interference patterns thereon, each said pattern being formed by the interference of first and second electromagnetic wavefront sets, where said first sets are comprised of electromagnetic wavefronts emanating from separate subjects and said second sets are comprised of electromagnetic wavefronts emanating from combinations of discrete and separate sources of electromagnetic wavefronts, each said combination being a unique coded representation of one of said subjects, and
   means for irradiating said hologram with electromagnetic radiation corresponding to a selected first set of electromagnetic wavefronts from a selected subject to produce an image of the particular second set of electro-magnetic wavefronts which is a coded representation of the subject used to produce said selected first set of electromagnetic wavefronts,
   means responsive to each electromagnetic wavefront in said image for producing electrical signals having the particular code corresponding to said selected subject.

6. A device of claim 5, where said interference patterns are spatially separate on said hologram, said means for irradiating including a source substantially coherent electromagnetic radiation and a medium containing said subjects, said subjects scattering said electromagnetic radiation from said source to said separate interference patterns on said hologram, the scattered radiation from each said subject being incident on the interference pattern formed by electromagnetic wavefronts emanating from said subject when said interference pattern is formed on said hologram, thereby producing said coded representation associated with said interference patterns.

7. The device of claim 6, where said means for irradiating includes means for directing said scattered electromagnetic radiation to selected portions of said hologram.

8. An optical device, comprising:
   a source of substantially coherent laser light,
   a recording medium,
   first means for irradiating a reference subject with a first selected portion of said laser light which produces scattered electromagnetic wavefronts that expose said recording medium to the electromagnetic wavefronts scattered by said subject,
   second means for separating a second selected given portion of said laser light into a plurality of discrete and separate sources of light that are mutually coherent with said first selected portion of said laser light,
   means for irradiating said recording medium with light from a combinatorial code of such discrete and separate point sources simultaneously with said scattered electromagnetic wavefronts from said subject to record on said recording medium the interference between said scattered wavefronts from said subject and light from said combinatorial code of point sources, said combinatorial code of point sources being different and unique for each separate subject being recorded,
   means for irradiating said recoridng medium with light that has been scattered from said subjects to produce wavefront patterns corresponding to combinatorial codes of said discrete and separate point sources representative of each subject used for reconstructing said combinatorial code wavefronts,
   means responsive to each reconstructed wavefront pattern for producing electrical signals having the combinatorial code associated with each said subject.

9. The device of claim 3, wherein said means for producing electrical signals is comprised of a plurality of photosensitive elements each of which is responsive to a different electromagnetic wavefront in said image.

10. The device of claim 3, wherein said means for producing electrical signals is comprised of an electron camera having a screen onto which said image is transmitted.

11. The device of claim 3, further including utilization means responsive to said coded electrical signals.

12. The device of claim 5, wherein said means for producing electrical signals is comprised of a plurality of photosensitive elements each of which is responsive to a different electromagnetic wavefront in said image.

13. The device of claim 5, wherein said means for producing electrical signals is comprised of an electron camera having a screen onto which said image is transmitted.

* * * * *